United States Patent Office 3,500,457
Patented Mar. 10, 1970

3,500,457
PROGRAMMED APPARATUS FOR AUTOMATI-
CALLY TESTING INTERWIRED CONNEC-
TIONS IN ELECTRONIC SYSTEMS
Paul T. Curley, Cincinnati, Ohio, assignor to The Cin-
cinnati Milling Machine Co., Cincinnati, Ohio, a cor-
poration of Ohio
Filed Sept. 14, 1967, Ser. No. 667,771
Int. Cl. G01r 31/02
U.S. Cl. 324—73                                  3 Claims

ABSTRACT OF THE DISCLOSURE

An automatic electronic apparatus is disclosed for testing the circuits represented by interconnected plug pins in the back plane of an electronic system such as a machine tool automatic control system. The apparatus tests each pin in the back plane for inclusion in each of the several circuits represented and it both identifies each pin improperly included in any particular circuit and each pin properly in a circuit but omitted therefrom.

The analyzer of the present invention is adapted to completely test the wiring interconnections of a many-point back plane wiring system such as that used in a control apparatus using plug-in printed circuit cards in a cage structure where interconnection between cards is by wired connection of the plugs with which the cards mate. In this type of system there are numerous independent circuits in the back plane, each circuit having many wired junction points. The process of finding errors in such a system of complex multiple circuits is very time consuming if each circuit must be checked by conventional methods. The invention herein employs digital pre-programming, commonly termed numerical control, to greatly diminish the time spent in determining the accuracy with which a back plane system has been wired.

One simplified approach to the problem has been to completely check each single circuit comprised of a group of pins at various points in the back plane, these pins being connected together by wired connections. In a complete circuit containing several pins, any one of the pins can be selected as the starting point or as the reference pin. A pre-determined voltage signal is placed on this reference pin and the remaining pins in the circuit are then chacked to see if the voltage signal is present on each. The absence of the voltage signal at any pin in the circuit will indicate a missing wire. If, however, there is a short to another circuit or an extra wire, it will not be shown in testing by this method.

To find a short or an extra wire, all pins not on the circuit being tested must also be checked. If the voltage signal is detected on one or more pins not in the test circuit, a short or extra wire is shown to be interconnecting the test circuit with another circuit in the back plane. The actual point where the short occurs or the pin where the extra wire is connected is not immediately apparent and it remains to be found by a process of elimination. However, armed with a schedule of pins correctly wired and a schedule further indicating, pin by pin, those circuits incorrectly wired, it is a relatively simple process for an inspector to identify the points at which correction must be made. This type of inspection is not used on any but the simplest circuits since it involves the repetitive checking of all pins in the back plane when each single circuit therein is checked. It is nearly impossible by present practices to provide 100% preinspection of complex equipment by this method.

SUMMARY

This invention herein comprises a digitally programmed apparatus for automatically testing the actual interwired connections in the back plane of an electronic system. The apparatus is so effective in aiding inspection that every back plane junction point can be tested when each single circuit is inspected and extra as well as missing connections are indicated. The system includes a program and program sensor, a timing control unit and testing means for serially scanning each of the pins in the back plane to detect the presence or absence of a test voltage supplied from a reference source. The program operates to set into information stores in the apparatus the identity of each back plane pin in any particular circuit and each circuit is tested by the scanning means after which the program advances to reset the information stores for the next circuit. Indicator means are also provided to identify the socket and pin on which the testing means finds an improper voltage level during its scanning function.

THE DRAWINGS

A clear understanding of the construction and operation of the apparatus of this invention can be obtained from the following detailed description and the drawings attached wherein.

DETAILED DESCRIPTION

Figure 3:
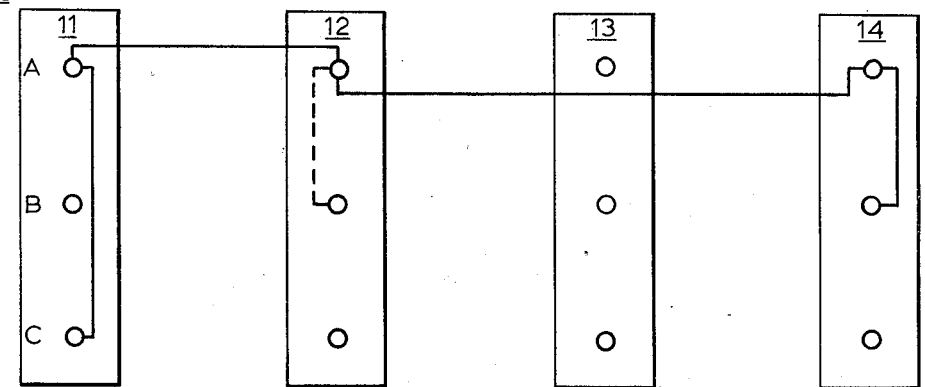
FIG. 3 is a diagrammatic showing of a back plane circuit through four sockets in which each socket has three pins.

The wiring fault analyzer of this invention repetitively checks all junction points or pins in the back plane of a system both for continuity of each circuit and for shorts or extra wires to other circuits until each and every circuit has been completely checked. As an example, a simplified back plane is shown in FIG. 3 having twelve pins divided into four socket groups 11–14 each containing three pins identified as pins A, B and C in descending order from top to bottom. Assume a circuit properly having connections to include pins A and C of socket 11, pin A of socket 12, pins A and B of socket 14 and no pins of socket 13. A reference pin is preselected and identified in the test program. In this example, assume it to be pin A of socket 11. A reference voltage, for example, a 12-volt signal is placed on this pin and the analyzer then checks all of the other pins in socket 11. The reference signal is not found on pin B, but is found to be present at pin C. This is correct and therefore no error is indicated for the pins of socket 11.

The test program is advanced to provide a new reference socket and pin numbers and assume that pin C of socket 11 now becomes the reference pin. Socket 12 is checked and a reference signal is found to be present on pin A and also on pin B. Pin B is not properly a part of the circuit being tested and should not have the reference signal present thereon. Thus, an error is indicated by the glow of an indicator lamp of a readout panel corresponding to pin B of socket 12. The glow of this lamp indicates this simply as an error but does not indicate that it is either an extra wire or a missing wire. At this point the automatic scanning function also stops to enable the operator to note the error on a charting of the pins and sockets. After noting the error, the operator will restart the analyzer and the system will resume automatic cycling until the circuit is completely checked or until another error is detected.

The error in socket 12 is not yet identified specifically as an extra wire which can cause a number of difficulties in various forms in the other circuits still to be checked. The error may show up in several sockets because it may connect two large circuits or it may show up only in socket 12 thus indicating that pin B of socket 12 is a dead pin not used for any circuit. The error might actually not be present in socket 12, but just be apparent there because of an error which is present at another socket connecting the circuit being tested to a circuit containing pin B of socket 12. We will assume for purposes of this simplified description, that pin B of socket 12 is a dead pin and that the error will not reflect in other sockets.

In checking socket 13 the reference pin again is moved by the programmed data and assume it to be pin A of socket 12. The analyzer checks all of the pins in socket 13 and finds no signal present. This is a correct testing and now the test continues to socket 14. Since the circuit being tested does not include any pins of sockets 13, the program will retain pin A of socket 12 as the reference pin. The signal in socket 14 is found to be present on pin A, not present on pin B and not present on pin C. Since there should be a signal on pin B, an error is indicated and a corresponding indicator light is illuminated on the readout panel. Since the analyzer only indicates error, the operator again must decide whether it is a short or a missing wire. After noting the error, the operator is ready to continue the test.

Since the test on this particular circuit is complete, the analyzer goes back to socket 1 and begins a second circuit. The process is then repeated for this and all remaining circuits. It is noted that in the simplified showing of FIG. 3, only one complete circuit is shown. However, additional circuits could be included on the back plane shown and the analyzer would test these additional circuits serially and automatically as the simplified circuit described has been tested. After the test is complete, the operator can quickly locate the trouble areas in the back plane from his noted errors and is able to correct them in very short time having their location identified from his charting. The time saved by this method is in finding the errors, not in correcting the error. This can be appreciated when it is known that many complex electronic systems may employ several hundred sockets, each with twenty or more pins in a back plane wired system.

Figure 1:
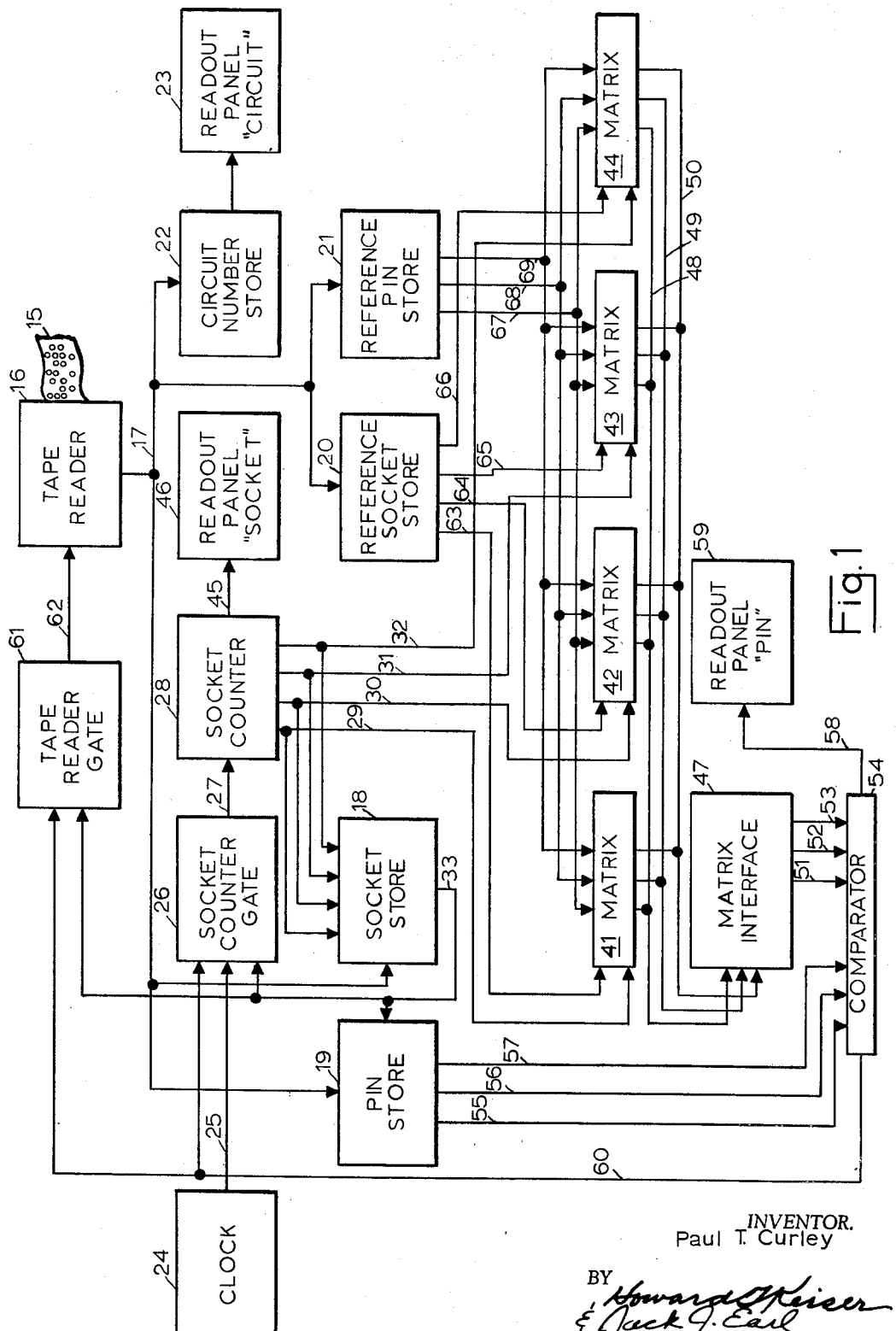
FIG. 1 is a block diagram of the analyzer of this invention.

The overall system of the apparatus is best described with reference to the block diagram of FIG. 1. A digitally encoded punched paper tape 15 contains the circuit test program information which is input to the analyzer. A reader 16 senses the tape 15 and converts the information thereon into command signals that operate the analyzer. The information is recorded on the tape 15 in related groupings or blocks each of which contains a number identifying the circuit to be tested, an identification of a reference socket and pin number therein, the number of the socket to be tested and an identification of the pins in that socket which are part of the particular circuit being tested. The data output of the reader 16 is in binary coded decimal form and includes portions delivered over a distribution network 17 to a socket number store 18, a pin store 19, a reference socket store 20, a reference pin store 21, and a circuit number store 22 in accordance with the addresses coded in conjunction with the information in each block. The socket number store 18 receives and holds the information defining the socket number of the point to be tested in the circuit. The pin store 19 receives information defining the identities of pins which are contained in the particular circuit being tested and in the socket designated by the socket number store 18. The reference pin store 21 holds information that identifies for reference purposes a preselected pin of the circuit being tested. The reference socket store 20 records and holds the socket number of the reference pin which may or may not be the same socket as the socket number contained in the socket number store 18.

The circuit number store 22 receives and holds the number of the circuit being tested and displays this number on a circuit readout panel 23. The readout is in the form of position coded lamps in a matrix or other similar schemes to display the decimal number. All of the stores except the reference socket store 20 are conventional transistor flip-flop circuits for holding binary coded data and include decoding network portions which change the binary coded decimal input from the tape to a pure decimal output for operator convenience. The reference socket store 20 is comprised of silicon controlled rectifier (SCR) circuits operated as flip-flops with a decoder similar to the other stores. The SCR circuits provide the higher power output which is needed to bias the various sockets and their use eliminates the need for parallel power output stages as would be required if transistor circuits were to be used.

When the described stores are filled, the wiring analyzer is ready to begin testing a circuit, the number of which is displayed on the readout panel 23 and corresponds to the circuit number retained in the circuit number store 22. As soon as the reader 16 reads one block of tape which concludes with an end-of-block symbol, a clock oscillator 24 is started and produces an output that is applied over a transmission line 25 to a socket counter gate 26. The output of this gate 26 is at the clock pulse frequency and is input over a line 27 to a socket counter 28. The socket counter 28 is a typical binary coded decimal counter circuit that counts up to the socket number stored in the socket number store 18. At each count, the counter 28 sends signals to the store 18 over output lines 29–32 and when the number in the store 18 corresponds to the signal from the counter 28, the store 18 produces an output that is carried over a data transfer line 33 to the gate 26. This inhibits the clock circuit output and stops the counter 28 at that point. The counter 28 then contains the same socket number as the socket number store 18 and an output is produced on that one of the group of output lines 29–32 connecting with the one of a group of socket matrices 41–44 corresponding to that number. The matrices 41–44 correspond in the simplified system to the sockets 11–14, respectively, which are connected thereto at each pin or junction point. It is understood that for a more complex system, many more of these matrices would be provided. The numerical output data is also transmitted over a cable 45 to a readout panel 46 that provides a visual display of this information through illumination of selected lights in a matrix.

Assuming, for example, that the output signal of the counter 28 is carried on the line 31, this will be an enabling input to the matrix 43. When there is a signal present on the line 31, the matrix 43 is activated to test the socket 13 in the simplified system described herein. Any one of the three pins A–C of socket 13 that are included in the circuit being tested will have the reference 12-volt thereon and will be indicated as being a part of the circuit being tested. To accomplish this while the matrix 43 is enabled, the reference 12-volt signal is transferred to a matrix interface 47 to bias to conduction any of the transistors therein corresponding with the pin numbers where the 12-volt signal is present. The 12-volt signal is applied to the interface 47 over a set of lines 48, 49, 50 corresponding to the pin positions A, B, C. Each of the interface transistor switches, when conducting, produces a ground potential signal as an output from any of these transistors on a corresponding one of a set of transmission lines 51, 52, 53 and this signal is the input to a voltage comparator 54 of conventional circuitry. The comparator 54 at this time contains information defining the pin numbers that are properly part of the circuit being tested. This information at the comparator 54 is transferred to it over selected ones of a test of output lines 55, 56, 57 from the pin store 19 which has been set by the information from a data block of the tape 15 and which information has been distributed over network 17 from the tape reader 16.

The circuit pin information is input to the comparator 54 from the pin store 19 when the data transfer signal on line 33 occurs as an input to the pin store 19. It completes the circuit from the flip-flops of that store 19 to their respective output lines 55, 56, and 57. The comparator 54 then compares the signals from the store 19 transmitted over lines 55–57 with the signal from the matrix interface 47 as transmitted over lines 51–53, respectively. If the signals coincide, the cycle is complete and no error signal is generated and output over the line. If the signals do not agree, then an error signal is transmitted over the cable 58 to the pin readout panel 59 where there is a visual indication of the pins which are wired in an erroneous circuit. The error signal is also transmitted over a line 60 as an input to the socket counter gate 26 and this signal inhibits that circuit in the same manner as does the transfer signal on line 33 to inhibit the gate 26 and to stop the socket counter 28. The error signal from the line 60 also is input to a gating circuit 61 which inhibits operation of the tape reader 16 by stopping the output of read commands over line 62 and thereby stops the wiring fault analyzer. Another input to the reader gate 61 is the data transfer signal on line 33 and when this signal is generated in the absence of an error signal on line 60, the tape reader 16 will proceed to read the next block of information from the tape 15. The analyzer then prepares itself to check the next socket circuit portion or the first socket portion of another circuit in the back plane.

As previously mentioned, pins that are properly connected in the test circuit have reference signals applied to them. The reference signal is supplied to the reference pin which is a pin selected from the circuit being tested and identified in the test program. The reference socket store 20 and the reference pin store 21 are recorded in the program and these function to indicate which point in the circuit has been selected as the reference point. As stated earlier herein, the stores 20 and 21 receive information from the tape reader at the same time that the socket store 18, the pin store 19 and the circuit store 22 receive information. The reference socket store 20 selectively produces any one of four outputs over lines 63–66, one for each socket in the back plane system in dependence upon the information stored therein. Assuming that the stored information identifies socket 12, an output would be generated on line 64 from the reference socket store 20 which is the bias line of the matrix 42. At the same time, the reference pin store 21 provides a unique output for one of the three pin numbers over a corresponding one of lines 67–69 in dependence upon the information stored therein. Assuming selection of pin B, an output would be generated on line 68. Thus, both a bias and a pin number signal are received by the matrix 42. When both of these conditions are met, the reference signal is placed on pin B of socket 12 and this becomes a reference point. For any particular pin and socket selection, there must be both a unique socket bias signal and a unique pin number signal to identify the reference point.

Figure 2:
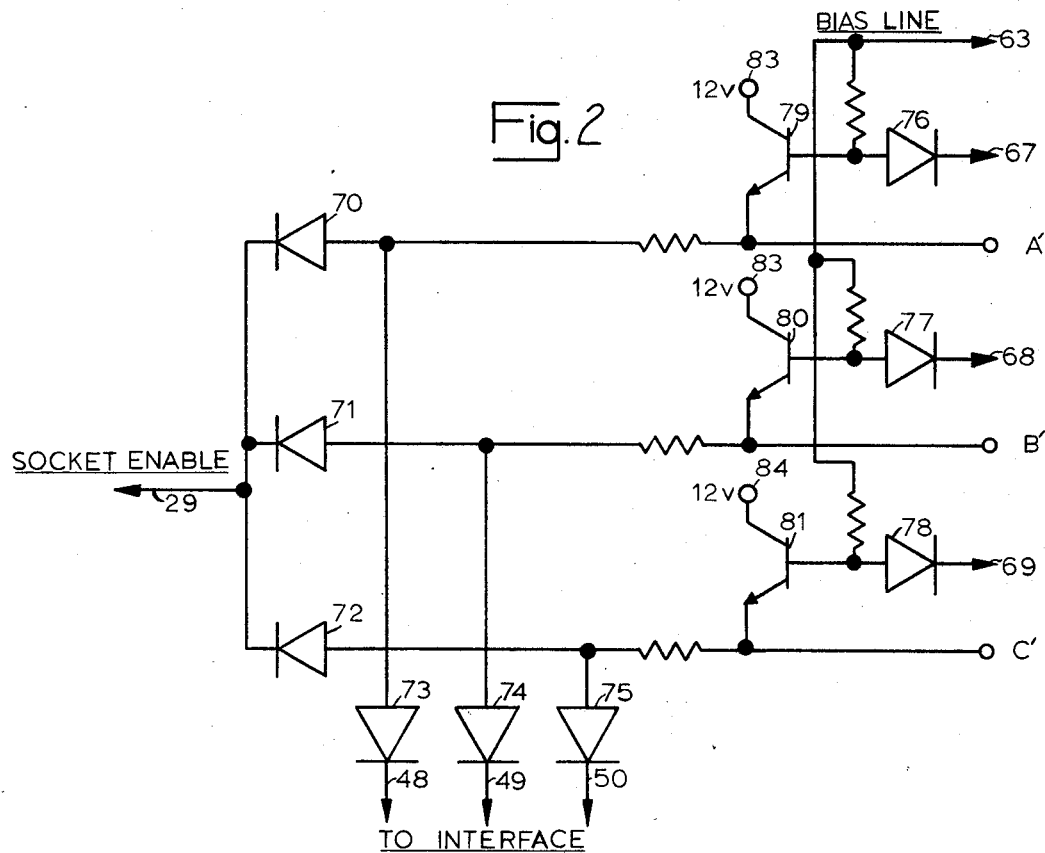
FIG. 2 is a detailed circuit diagram of a typical socket matrix of the analyzer.

A diagram in detail of the circuitry of the matrix 41 is shown in FIG. 2 and is exemplary of the other matrices 42, 43 and 44, each of which is identical with the matrix 41 both in circuit and in function. The matrix 41 can be used in two modes. One is to test the connections in the circuit of the pins of a corresponding socket and the other is to identify the reference point location. The matrix 41 can perform the functions of both modes either singularly or simultaneously. To perform the testing function, there must be a signal on the enable line 29 originating at the socket counter 28. This is a signal of positive polarity and biases the diodes 70–72 to allow the transmission of current from the respective terminals A', B', C' to and through corresponding output diodes 73–75 connecting with the lines 48–50 to the interface circuit 47. Thus, if there is a reference signal on any one of the pins A, B or C of any socket connected thereto and in the exemplary case socket 11 of FIG. 3, it will be reflected as a voltage signal at the respective diode 73–75 and this voltage signal becomes the input over one of the lines 48–50 to the matrix interface 47 described previously. Hence, from the above explanation, inputs A' and 29, B' and 29, and C' and 29 with their respective diode combinations of 70 and 73, 71 and 74, and 72 and 75 are logic AND circuits well-known in the art.

When the circuit 41 is operated in the mode to identify a reference point, two conditions must be met. First a bias signal must be present on the line 63 extending from the reference socket store 20 and second, there must be an input on one of the reference pin lines 67–69 from the reference pin store 21 and connecting through protective diodes 76–78. Assuming pin B of socket 11 to be the reference pin, a positive signal will be present on line 68. This signal combined with the signal from bias line 63 will return on the switching transistor 80 and allow the 12-volt signal from a terminal 83 to reach pin B through its connection with test terminal B'. The terminal 83 and the similar terminals 82 and 84 are all connected to a power supply of conventional form (not shown) which provides the reference signal. Thus, any other pin wired to pin B of socket 11 will have the reference potential present thereon, and will be indicated as being in the circuit with that pin. When either the bias signal on line 63 or the reference pin input on line 68 is reduced or lowered to ground potential, the reference signal is removed and pin B of socket 11 will cease to be the reference point. Either of the other pins A or C of socket 11 can similarly be selected as reference pins by the switching on of the transistors 79 and 81, respectively, in the same manner that transistor 80 is caused to conduct full on.

The system provides an economy of programming that is not at first apparent in the description. It is not necessary to include on the tape 15 blocks of information for those sockets which have no pins in a particular circuit but these will be checked nevertheless. The socket counter 28 operates to serially output signals on the lines 29–32 as it counts and it is only when this count matches the data stored in the unit 18, the socket store, that the counting is inhibited. As the lines 29–32 are serially supplied with the enabling signal so then the matrices 41–44 will be serially enabled and potentially will produce an output through the matrix interface 47 to the comparator 54. No output is provided from the pin store 19 until the socket store 18 is matched by the count in the counter 28. The no output condition corresponds to a no pins signal for a socket. If the wiring is correct, the outputs from the matrices 41–44 over lines 48–50 will not indicate the reference potential while the counter 28 steps through the counts for sockets having no pins included in the particular circuit being tested. If a pin is detected having the reference potential, an error signal will be produced and the pin readout panel will indicate this. The pin will be identified by socket since the socket readout panel 46 is driven directly by the socket counter 28 and is not set by the socket store 18. The comparator will produce the inhibit signal on the line 60 to stop the circuit operation in the same manner as if an error were detected on the socket for which data has been stored in units 18 and 19.

From this description it can be seen that the system need only be programmed for those sockets having pins in a particular circuit as that circuit is tested but all other sockets will be tested to determine whether extra wires may exist. For example, in the simplified system of FIG. 3, the tape 15 will be furnished with blocks of information for sockets 11, 12 and 14 but as the socket counter 28 counts from 12 through 13 and on to 14, the socket 13 will be checked for extra wires although it has not been specifically tested on the tape 15.

While the invention has been described in connection with a simplified socket and pin situation, it can readily be seen that by paralleling additional matrices like those of FIG. 1 additional sockets can be tested. Also by paralleling additional circuits within each of the matrices as exemplified by FIG. 2, additional pins for each socket can be accommodated and more complex and extensive circuits can be tested. This testing is carried out at electronic speed and therefore the system makes practical the complete testing of a large system and quickly identifies the faults in back plane wiring.

What is claimed is:

1. An apparatus for indicating an error in the placement of wires on a back plane of sockets, according to a predetermined layout of circuits between pins of the sockets contained thereon, the apparatus comprising in combination:
   (a) an input program for identifying in serial blocks the circuit locations to be checked, each block identifies a particular socket in the circuit being tested, the pins on said socket included in said circuit, and another pin and socket location to determine a reference point,
   (b) two storage elements connected to receive the input program, the first element stores the particular socket and associated pins information, the second element stores the reference pin and socket information,
   (c) a digital counter having a unique state for each socket in the back plane,
   (d) a matrix network coupling the back plane to the second storage element and the counter, said matrix produces an output dependent on the state of the counter, the reference point, and the wire placements, said matrix network comprising
      (1) an input matrix network, consisting of an identical set of elements for each pin in the back plane, each set of elements includes
         an electronic switch responsive to the second storage element, and
         an electronic gating network connected to its respective pin and the digital counter, said network produces an output only when energized by both of the connected elements, and
      (2) an output interface having a plurality of inputs, each input consists of a parallel combination of all gating network outputs having a common pin identity with respect to the sockets, the interface produces outputs to the comparator upon application of a signal to a respective input, and
   (e) a binary comparator, having the first storage element and the matrix output as inputs, for indicating non-coincidence between said inputs as an error condition, wherein said comparator is comprised of a plurality of identical comparison circuits, each circuit including
      (1) a first input connected to an output of the matrix,
      (2) a second input responsive to respective pin information in the first storage element, and
      (3) means for transmitting an error signal and the identity of each input when said inputs are not of the same identity.

2. An apparatus for indicating error in the routing of wires between pins on a back plane of sockets, according to a predetermined layout of circuits, said apparatus comprises:
   (a) means to input information determined by a particular circuit, said information includes,
      (1) a pin and socket location defining a reference point, and
      (2) test pins and sockets in the order in which they occur in said circuit,
   (b) a counting device that sequentially applies a signal to each socket in the back plane,
   (c) a matrix network for coupling the reference pin and socket and the counting device as inputs to the back plane to produce outputs according to said inputs and the wire routings, the matrix network includes
      (1) a plurality of first electronic switches, each is connected to a pin on the back plane and is responsive to the reference pin input,
      (2) means for biasing each of said first switches with its respective reference socket input, such that it only responds to the reference pin input when a signal exists on the reference socket input,
      (3) a plurality of logic AND gates, each having a first input coupled to a pin on the back plane and a second input coupled to the counting device, and
      (4) a plurality of second electronic switches, each is connected to a parallel combination of AND gate outputs having a common pin identity with respect to the sockets and switches an output when a signal is generated by any of the parallel AND gates, and
   (d) a comparator having the test pins and second switch outputs as inputs for indicating error when there is non-coincidence between said inputs.

3. An apparatus for indicating error in the placement of wires between pins on a back plane of sockets according to a predetermined layout of circuits, the apparatus comprising in combination:
   (a) an input program responsive to the error signal for identifying in serial blocks the wire placements to be checked, each suuccessive block identifies a particular circuit, a sequentially occurring socket in said circuit, all of its pins included therein, and a second pin and socket placement in said circuit as a reference point,
   (b) a plurality of storage elements with inputs for receiving the input program and including
      (1) a first storage element to hold the particular circuit identity,
      (2) a second storage element to hold the identity of the sequentially occurring socket, said element includes means for detecting coincidence between the stored information and a second input,
      (3) a third storage element to hold the identity of said socket's pins that are in the particular circuit, said element includes an output gate responsive to the detection means of second storage element to control the transmission of pin information, and
      (4) a fourth storage element to hold the identity of the reference pin and socket,
   (c) a counting device having unique states assigned sequentially to respective back plane sockets and connected to transmit signals produced therein representative of the unique states to the second input of the second storage element,
   (d) a matrix network for coupling the back plane to the counting device and the fourth storage element, said network produces an output dependent on the coupled signals and the wire placements,
   (e) a comparator having the matrix network output and the output gate of the third storage element as inputs and indicates as error non-coincidence between said inputs,
   (f) means for gating the counting device such that it is responsive to the error signal and functions to (1) initiate the counting device to sequentially step through its states, said stepping sequentially checks all sockets in the back plane,
(2) stop the counting device upon an indication of error, and
(3) restart the counting device after the error has been recorded, and
(g) a plurality of display devices to provide a decimal read-out, said devices include
(1) a display device connected to the first storage element to display the identity of the particular circuit being checked,
(2) a display device connected to the socket counter to indicate the particular socket being checked,
(3) a display device connected to the comparator to indicate the identity of pins when an error is indicated.

References Cited

UNITED STATES PATENTS 3,246,240   4/1966   Arnold _____ 324—73

RUDOLPH V. ROLINEC, Primary Examiner

E. L. STOLARUN, Assistant Examiner

U.S. Cl. X.R.

324—51